United States Patent [19]

Niederhauser et al.

[11] 3,999,842
[45] Dec. 28, 1976

[54] SYNCHRONIZATION PROCEDURE AND MEANS OF APPLICATION OF THE PROCEDURE

[75] Inventors: Marc Niederhauser, Boudry; Claude Kreienbühl, Yverdon, both of Switzerland

[73] Assignee: Bolex International SA, Ste. Croix, Switzerland

[22] Filed: Aug. 26, 1974

[21] Appl. No.: 500,514

[30] Foreign Application Priority Data

Sept. 6, 1973 Switzerland .................. 13044/73

[52] U.S. Cl. .................................... 352/5; 352/17; 352/25; 352/31
[51] Int. Cl.² ........................................ G03B 31/00
[58] Field of Search .............. 352/5, 12, 15, 16, 17, 352/19, 20, 25, 31

[56] References Cited
UNITED STATES PATENTS

| | | | |
|---|---|---|---|
| 3,620,609 | 11/1971 | John, Jr. ........................ | 352/25 |
| 3,666,356 | 5/1972 | Williams ........................ | 352/5 |
| 3,674,346 | 7/1972 | Lancor, Jr. .................... | 352/12 |
| 3,751,143 | 8/1973 | Rosenfield .................... | 352/12 |
| 3,804,497 | 4/1974 | Ogiso et al. .................. | 352/5 |

Primary Examiner—Russell E. Adams, Jr.

[57] ABSTRACT

A method and apparatus for the resynchronization of the transport of movie film (image carrier) with the movement of another information-carrying medium such as sound tape film. Speed control and synchronization signals are produced by means of sensing the sound tape movement which provides control synchronization signal, monitoring the image frames for each sequence on the movie film by means of a counter, and comparing in a coincidence circuit the image frame count signal with the signal from the sound tape. Desynchronization of the movie film and tape is indicated by the absence of a predetermined relationship between the number of image frames in a given sequence and the signal from the sound tape, whereupon the coincidence circuit energizes an appropriate control means via a switching mechanism, such as a gate circuit, which produces a resynchronization of the film and the sound tape.

11 Claims, 2 Drawing Figures

SYNCHRONIZATION PROCEDURE AND MEANS OF APPLICATION OF THE PROCEDURE

FIELD OF INVENTION

The present invention relates to a method and apparatus for synchronizing movement of cinematographic film with another information carrier (such as magnetic tape) in which the film has coding marks at the beginning of every predetermined sequence and in which the information carrier has coding marks corresponding with each frame of the cinematographic film.

BACKGROUND

Devices are already known in which the movement of a cinematographic film is controlled by an impulse registered on a magnetic tape which unwinds simultaneously with the film and which carries at least one sound-track corresponding with the sequences in the film. In such devices, a control impulse registered on the magnetic tape corresponds with each frame of the film. If for any reason an impulse is "lost", i.e. a registered code marking of the information carrier drops out or is not sensed, the film and the information carrier then remain out of phase. This can be particularly undesirable when the film is projected frame by frame and a relatively long text corresponds with one frame.

SUMMARY OF INVENTION

The present invention proposes to remedy this drawback with a synchronization method and apparatus in which the code markings on the information carrier are transformed into a first signal which instantaneously controls the speed of projection of each frame of the film with the information carrier, the said signal controlling the synchronization always coincides with the control signal from the beginning of each sequence. During one sequence the signal controlling the synchronization and the control signal are superimposed for all the frames having an order number in accordance with a predetermined law of recurrence f(A) or which coincides with a predetermined modulus. Furthermore, the number of frames are counted as the film moves forward by a ring-counter the number of readings of which correspond with modulus A, the said counter being automatically set at a given reading by a coding on the film indicating the start of a sequence. When the film and the information carrier are perfectly synchronized a synchronization check signal corresponds with the said reading on the counter. When they do not coincide the film is moved forward automatically.

The synchronization of a cinematographic film and an information carrier, e.g. a magnetic tape, may be permanently checked by this procedure and the film may be automatically moved forward when a desynchronization is sensed.

In a preferred form of the invention the code markings on the film indicating the start of each sequence are either optical, coloured or otherwise, or notches in the edge of the film made by a known technique. It is thus possible to locate the start of each sequence either manually or automatically. The information carrier is preferably a magnetic tape. The code marks are at one frequency $F_1$ corresponding with the control signals for instantaneous projection and at another frequency $F_2$ corresponding with the control signals for synchronization. Hereafter, these signals will be referred to simply as the control signal and the synchronization signal. At the start of each sequence a synchronization signal is superimposed on a control signal. During the sequence, there is a synchronization signal superimposed on each corresponding control signal every A control signals, i.e. every A frames of the film in theory; A being a predetermined whole number.

In general, given that a sequence has $n$ frames, the frames are numbered from 1 to $n$. For practical reasons, a control signal and a synchronization signal are superimposed at the start of each sequence, on the second frame in one example of the invention. If $N_o$ is the order number of the first frame on which there are superimposed the signals for control and synchronization, i.e. the second frame in the sequence, then $N_o = 2$.

If $N_1$ is the order number of the second frame on which there are superimposed the signals for control and synchronization, then $N_1 = N_o + A$ (where A is the predetermined recurrence modulus), therefore $N_1 = 2 + A$.

Similarly $N_3 = N_2 + A = N_1 + 2A = N_o + 3A$ and finally $N_i = N_{i-1} + A$   $N_i = 2 + i \cdot A$ Where $i$ represents a whole number between 0 and $j$, $$j = \phi(n,A) = \frac{n-2}{A}$$

E.g. Let $A = 4$ and the number of frames in a given sequence, $n = 19$.

The order numbers of the frames on which there are superimposed the signal for the control and synchronization are empirically determined: 2, 6, 10, 14 and 18.

In order to verify the formula, let us calculate the order numbers using $N_i = 2 + i \cdot A$ with $A = 4$ and $i = 0, 1, 2, 3$ and 4. In this case $$j = \frac{21-2}{4} = \frac{19}{4}.$$

$N_o = 2$   $N_1 = 6$   $N_2 = 10$   $N_3 = 14$   $N_4 = 18$.

In the case where $A = 4$, three impulses may be "lost", i.e. the film may be anything up to three frames behind the magnetic tape. However, in practice it is found in most cases only one frame is lost at the time. Therefore, it is preferable to adopt the recurrence modulus, $A = 2$.

To take the preceding example given that $A = 2$ and the number of frames in the sequence is 21, the order numbers of the frames on which the control signal is superimposed on a synchronization signal, determined by the formula $N_i = 2 + i \cdot A$, are $N_o = 2$   $N_1 = 4$   $N_2 = 6$   $N_3 = 8$   $N_4 = 10$   $N_5 = 12$   $N_6 = 14$   $N_7 = 16$   $N_8 = 18$   $N_9 = 20$, $j = 19/2$ therefore $i = 0, 1, 2, 3, 4, 5, 6, 7, 8$ and 9.

The synchronizing device has an electro-magnetically operated mechanism which causes the film to move forward intermittently. The electro-magnet is normally controlled by impulses from the stage which decodes the marks of the magnetic tape. Occasionally, this electro-magnet is controlled by an impulse generator introduced into the circuit when a desynchronization has been noticed between the film and the magnetic tape. A coincidence stage controls the introduction of the said impulse generator into the circuit by means of opening or closing a gate circuit according to the information received from the frame counter and the circuit which decodes the marks on the magnetic tape. The counter is reset at zero at the start of each sequence as indicated by the marks on the film.

DRAWINGS

The present invention will be more readily understood on reference to the following detailed description taken with the accompanying drawings in which.

DETAILED DESCRIPTION

Figure 1:
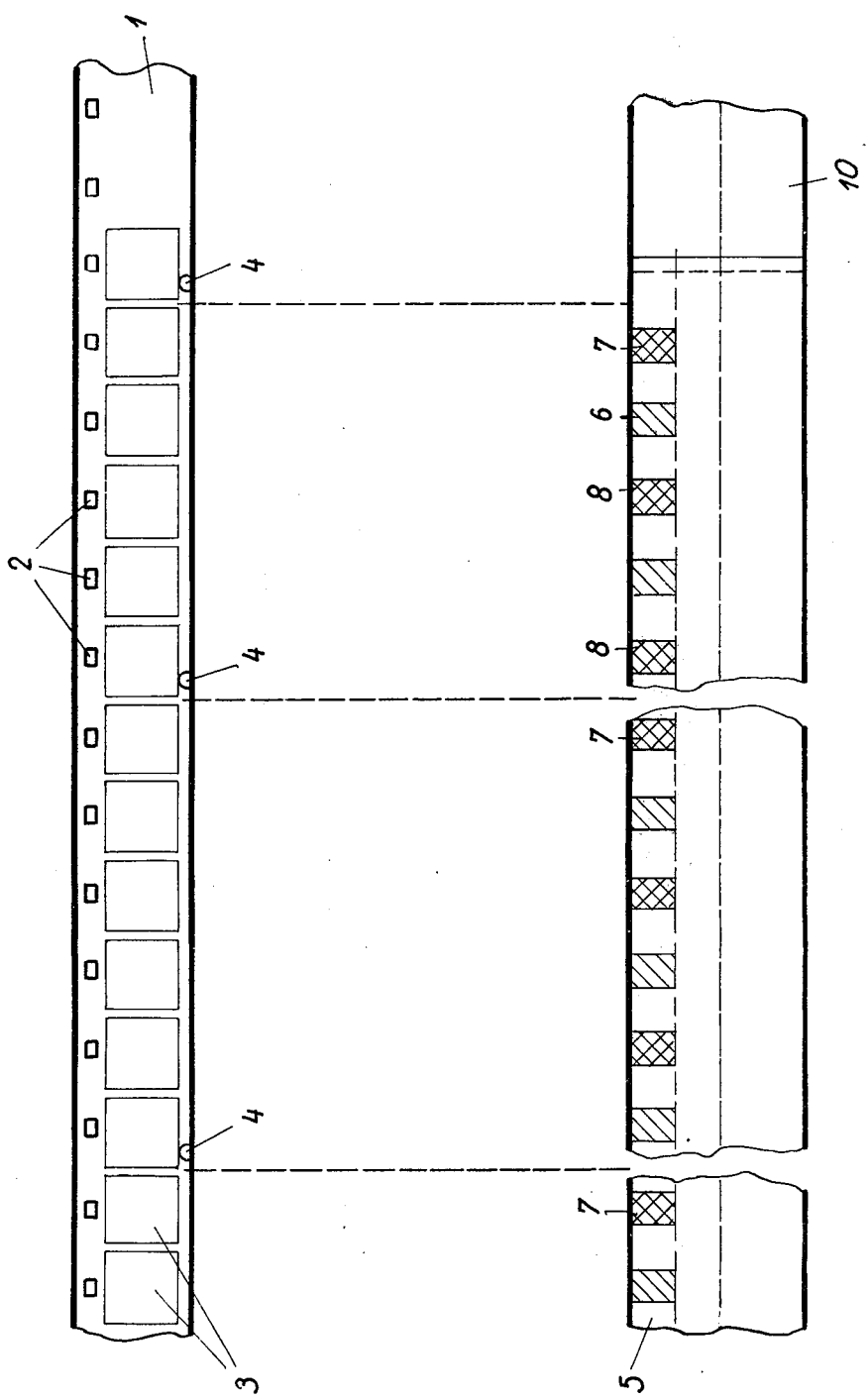
FIG. 1 is a diagram of a film and tape according to this invention in which the recurrence modulus is equal to 2.

With reference to FIG. 1, 1 is a strip of cinematographic film with perforations 2 situated on the side opposite the frames 3 in the usual manner, e.g. as in Super 8 film. The start of each sequence is marked by an optical mark 4 or a notch (not shown) in the edge of the film. A magnetic tape 10 with several tracks carries the sound which corresponds with the film 1. One of the tracks 5 carries code workings represented by hatched rectangles. A signal represented by a hatched rectangle 6 corresponds with each frame. A synchronization signal 7 represented by a cross-hatched rectangle is superimposed at every second frame. Furthermore, within each sequence every second frame corresponds with a composite signal as described above represented by a rectangle 8 identical to the rectangles 7 at the beginning of each sequence.

Figure 2:
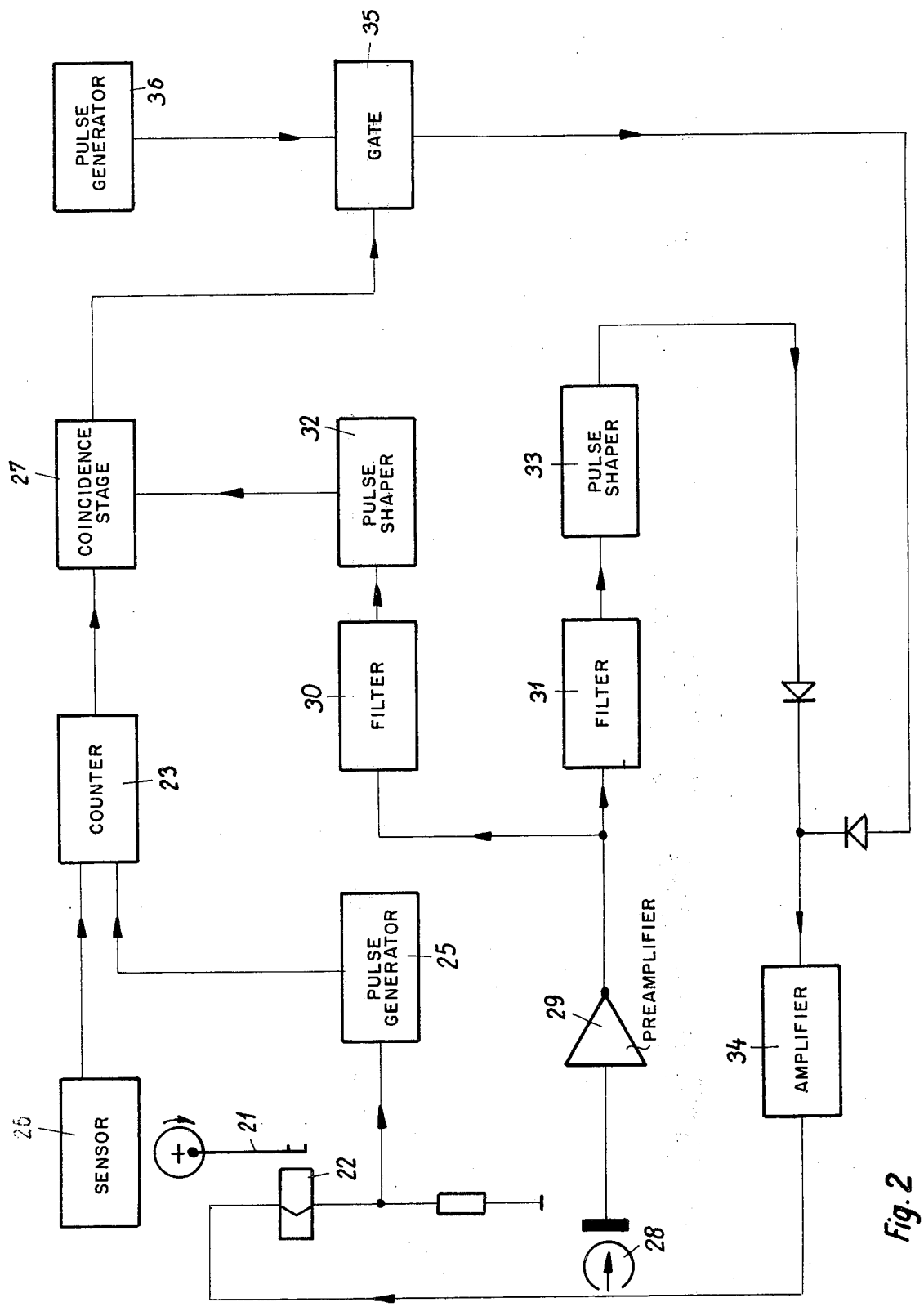
FIG. 2 is a diagrammatic view of a method and apparatus according to the invention.

With reference to FIG. 2 the means of application of the method used in or combined with a cinematographic projector, has a claw mechanism 21 operated by an electro-magnet 22. A counter 23 for counting the number of frames in each sequence is connected on the one hand to a control circuit of the electro-magnet through a pulse generator or former 25 and on the other hand to a known device 26 for sensing the code markings indicating the beginning of a new sequence. The output is applied to a coincidence stage 27. A reading head 28 transmits current to a pre-amplifier 29 from which it is applied to two frequency filters 30 and 31 which separate the synchronizing signals from the control signals. The filter 30 is connected through a pulse former or shaper circuit 32 to the coincidence stage 27. The filter 31 is connected through a pulse former or shaper circuit 33 and an amplifier 34 to claw 21. The output current from the coincidence stage 27 flows to and input of a gate circuit 35 and another input is connected to an impulse generator 36 which may be, for example, a generator synchronized with the projector shutter (not shown). The output of the gate circuit 35 is connected to the control circuit of the claw.

While the projector is running, the device 26 reads the markings 4 on the film 1 indicating the beginning of each sequence and transmits a signal putting the counters back to zero at the beginning of each sequence. Each control signal is read by the tape reading head 28 which produces an output signal that is amplified by preamplifier 29 and filtered by the filter 31 (which permits only image frame signals to pass through). The filtered signal then is fed through the pulse shaper circuit 33 from which an impulse is transmitted to the control circuit 34 which energizes the electromagnet 22 to cause the claw to react by moving the film forward one frame length. When the film and the magnetic tape are synchronized, a synchronization signal 8 is read by the reading head 28, amplified by preamplifier 29 and filtered by the filter 30. The filtered signal (signals from 7 and 8 on the tape are filtered out) is transformed into an impulse in the pulse shape circuit 32, which in turn transmit the formed pulse to the coincidence stage 27 where it normally coincides with a predetermined condition of the counter 23 corresponding with an image bearing an even number in a predetermined sequence (see FIG. 1). If it does not coincide, the magnetic tape and the film are out of phase. in such a case, a control impulse has not been transmitted normally to the claw control mechanism and the film is at most one frame behind the magnetic tape. The coincidence stage 27 transmits a signal to the gate circuit 35 which opens letting through a signal from the impulse generator 36. A signal from the pulse generator 36 is transmitted to the claw mechanism by energizing the electromagnet 22 which causes the film to move forward one frame. In this way the film and the magnetic tape are again synchronized i.e. resynchronized.

It will be understood that various modifications can be made to the herein disclosed embodiment without departing from the spirit and scope of the invention.

What is claimed is:

1. A method of resynchronizing the transport of an image carrier having a plurality of image frames with an information carrier which includes a plurality of signal producing markings, at least one marking for each predetermined number of image frames on said image carrier, with each marking bearing information which correlates to the respective predetermined number of image frames, said markings on said information carrier periodically spaced along said information carrier with each (A)th marking being of a second type producing a signal different from that produced by said one marking, wherein (A) is a predetermined modulus which corresponds to a whole number, comprising the steps of:
   a. driving said information carrier;
   b. obtaining a first signal from said marking correlating to each predetermined number of image frames;
   c. transporting said image carrier said predetermined number of image frames upon each occurrence of said first signal;
   d. obtaining a second signal from said second type markings on said information carrier;
   e. counting the number of transported image frames of said image carrier;
   f. comparing the number of transported image frames with said second signal; and
   g. transporting said image carrier at least one image frame with respect to said information carrier when upon occurrence of said second signal said counted image frames of (e) do not correspond to said modulus.

2. A method according to claim 1 further comprising the steps of:
   h. providing on said image carrier a start marking the beginning of each of a predetermined sequence of image frames; and
   i. starting to count anew said transported image frames each time a start mark on said image carrier is detected during transport thereof.

3. A method according to claim 1 wherein the modulus A is 4.

4. A method according to claim 1 wherein the modulus A is 2.

5. A method according to claim 1 including the step of filtering said second signal received from said information carrier prior to delivery thereof to said counter.

6. A system for resynchronizing the transport of an image carrier having a plurality of image frames with the transport of an information carrier having a plurality of markings including at least a first type of marking thereon corresponding to a predetermined number of image frames on said image carrier which bears information that correlates to said predetermined number of image frames, wherein periodically each (A)th marking is of a second type, where (A) is a predetermined modulus that corresponds to a whole number;
- first means for supplying a first electrical signal derived from said first type marking and a second signal different from said first signal from said second type marking;
- second means connected to said first means for coupling each of said first signals for transporting said image carrier for said predetermined number of image frames;
- counter means for counting the recurrence of said first signal and the number of image frames transported and providing an output signal;
- comparison means having first and second inputs, said first input being connected to the output of said counter means for receiving said output signal therefrom and said second input being connected to the output of said second means for receiving said second signal, said comparison means providing a first output signal indicative that the transport of said image carrier and said information carrier is synchronized in accordance with the condition that the number of occurrences of said first signal is divisible by said modulus, and said comparison means providing a second output signal different from said first output signal when said information carrier is out of synchronization with said image carrier in the event that said condition does not exist;
- means for receiving said first and said second output signals from said comparison means for causing the transport of said image carrier at least one frame with respect to said information carrier only when said second output signal is delivered by said comparison means.

7. A system according to claim 6 wherein said last-named means comprises signal generating means for generating at least one auxiliary signal corresponding to said first signal each time said second output signal is delivered from said comparison means.

8. A system according to claim 7 wherein said signal generating means comprises a pulse generator for generating said auxiliary signal, and gate circuit means controlled by said first and second output signals from said comparison means, said gate circuit upon receipt of second output signal being opened to pass through at least one of said auxiliary signals.

9. A system according to claim 6 wherein said second means comprises a first filter which is selective to said first signal and a second filter which is selective to said second signal.

10. A system according to claim 6 wherein said modulus is 2.

11. A system according to claim 6 including second means for supplying a control signal derived from said start markings at the beginning of each predetermined sequence of frames on said image carrier, said counter means being connected to said second supply means for being reset to zero by said control signal.

* * * * *